United States Patent
Secker-Walker et al.

(10) Patent No.: US 10,320,757 B1
(45) Date of Patent: Jun. 11, 2019

(54) BOUNDED ACCESS TO CRITICAL DATA

(71) Applicant: Amazon Technologies, Inc., Reno, NV (US)

(72) Inventors: Hugh Evan Secker-Walker, Newburyport, MA (US); Nitin Sivakrishnan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 531 days.

(21) Appl. No.: 14/298,181

(22) Filed: Jun. 6, 2014

(51) Int. Cl.
G06F 7/04 (2006.01)
H04L 29/06 (2006.01)

(52) U.S. Cl.
CPC ...... H04L 63/0442 (2013.01); H04L 63/0876 (2013.01)

(58) Field of Classification Search
None
See application file for complete search history.

(56) References Cited

U.S. PATENT DOCUMENTS

| | | | | |
|---|---|---|---|---|
| 5,778,395 A * | 7/1998 | Whiting | ............ | G06F 11/1464 |
| 5,930,514 A * | 7/1999 | Thompson | ............ | G06F 8/62 |
| | | | | 707/999.202 |
| 6,105,012 A * | 8/2000 | Chang | ............ | G06Q 20/00 |
| | | | | 380/277 |
| 6,324,650 B1 * | 11/2001 | Ogilvie | ............ | G06F 21/6209 |
| | | | | 726/2 |
| 6,367,019 B1 * | 4/2002 | Ansell | ............ | G06F 21/10 |
| | | | | 380/277 |
| 7,203,844 B1 * | 4/2007 | Oxford | ............ | G06F 21/10 |
| | | | | 380/269 |
| 7,559,088 B2 * | 7/2009 | Cohen | ............ | G06F 11/1448 |
| | | | | 726/1 |
| 7,657,928 B2 * | 2/2010 | Shima | ............ | H04L 12/2805 |
| | | | | 726/27 |
| 7,849,328 B2 * | 12/2010 | Blumenau | ............ | G06F 17/30091 |
| | | | | 713/189 |
| 8,887,298 B2 * | 11/2014 | Reid | ............ | H04L 9/3247 |
| | | | | 713/165 |
| 2002/0033838 A1 * | 3/2002 | Krueger | ............ | G06F 9/44521 |
| | | | | 715/700 |
| 2002/0129275 A1 * | 9/2002 | Decuir | ............ | H04L 63/0428 |
| | | | | 726/28 |
| 2002/0194314 A1 * | 12/2002 | Kouznetsov | ............ | G06F 8/00 |
| | | | | 709/220 |
| 2003/0048907 A1 * | 3/2003 | Nakahara | ............ | G06F 21/10 |
| | | | | 380/277 |
| 2003/0223766 A1 * | 12/2003 | Imai | ............ | G03G 15/5083 |
| | | | | 399/8 |

(Continued)

Primary Examiner — Piotr Poltorak
(74) Attorney, Agent, or Firm — Pierce Atwood LLP

(57) ABSTRACT

A secure repository receives and stores user data, and shares the user data with trusted client devices. The user data may be shared individually or as part of bundled data relating to multiple users, but in either case, the secure repository associates specific data with specific users. This association is maintained by the trusted client devices, even after the data is altered by processing on the client device. If a user requests a purge of their data, the system deletes and/or disables that data on both the repository and the client devices, as well as deleting and/or disabling processed data derived from that user's data, unless a determination has been made that the processed data no longer contains confidential information.

22 Claims, 5 Drawing Sheets

(56) References Cited

U.S. PATENT DOCUMENTS

| | | | |
|---|---|---|---|
| 2003/0236950 A1* | 12/2003 | Clarke | G06F 12/0833 711/144 |
| 2004/0148356 A1* | 7/2004 | Bishop, Jr. | H04L 51/38 709/206 |
| 2004/0193899 A1* | 9/2004 | Satake | G06F 21/6245 713/190 |
| 2005/0114684 A1* | 5/2005 | Ohno | G06F 21/6218 713/187 |
| 2006/0041932 A1* | 2/2006 | Cromer | H04L 9/3226 726/6 |
| 2006/0078127 A1* | 4/2006 | Cacayorin | H04K 1/00 380/286 |
| 2006/0129830 A1* | 6/2006 | Haller | G06F 21/31 713/183 |
| 2006/0210085 A1* | 9/2006 | Ho | H04N 5/913 380/279 |
| 2007/0061528 A1* | 3/2007 | Shibata | G06F 11/1456 711/162 |
| 2008/0037723 A1* | 2/2008 | Milstein | H04M 3/53375 379/88.12 |
| 2008/0168229 A1* | 7/2008 | Beelen | G06F 17/30902 711/118 |
| 2011/0113109 A1* | 5/2011 | LeVasseur | H04L 51/12 709/206 |
| 2012/0005165 A1* | 1/2012 | Tsai | G06F 11/1456 707/652 |
| 2013/0144845 A1* | 6/2013 | Ghuge | G06F 17/3015 707/692 |
| 2014/0053002 A1* | 2/2014 | Muller | G06F 21/6209 713/193 |
| 2014/0067929 A1* | 3/2014 | Kirigin | H04L 67/06 709/204 |
| 2015/0201040 A1* | 7/2015 | Horling | H04L 67/1095 709/203 |

* cited by examiner

BOUNDED ACCESS TO CRITICAL DATA

BACKGROUND

The occurrence of high profile security breaches and stolen user data undermines confidence in electronic commerce. Each theft is a breach of trust that may violate the privacy and property interests of the user. Meanwhile, the study of user information by independent researchers can provide valuable insights, including market analytics and the identification of sociologic, demographic and economic trends. The continued viability of this research depends upon a statistically significant pool of users to continue to opt-in.

BRIEF DESCRIPTION OF DRAWINGS

For a more complete understanding of the present disclosure, reference is now made to the following description taken in conjunction with the accompanying drawings.

DETAILED DESCRIPTION

While data repositories for researchers may track which data is associated with which user, and what data is accessed by what researchers, that tracking typically does not extend to researcher's client computers. Once a researcher alters user data, the linkage back to the user breaks down. Thus if a user later requests deletion of their data, it may be deleted from the original repository, but copies of that data (either in its original form or in an altered form) may still exist with researchers.

Disclosed is a system that provides tracking of user data, associating both original and processed data with the user so that researchers' client computers can comply with deletion requests from the originating user. The user data, although distributed across multiple devices, remains in a "closed" system. User data may be removed only after it has been rendered sufficiently anonymous by processing and/or aggregating so as to no longer convey the user's original data.

Figure 1:
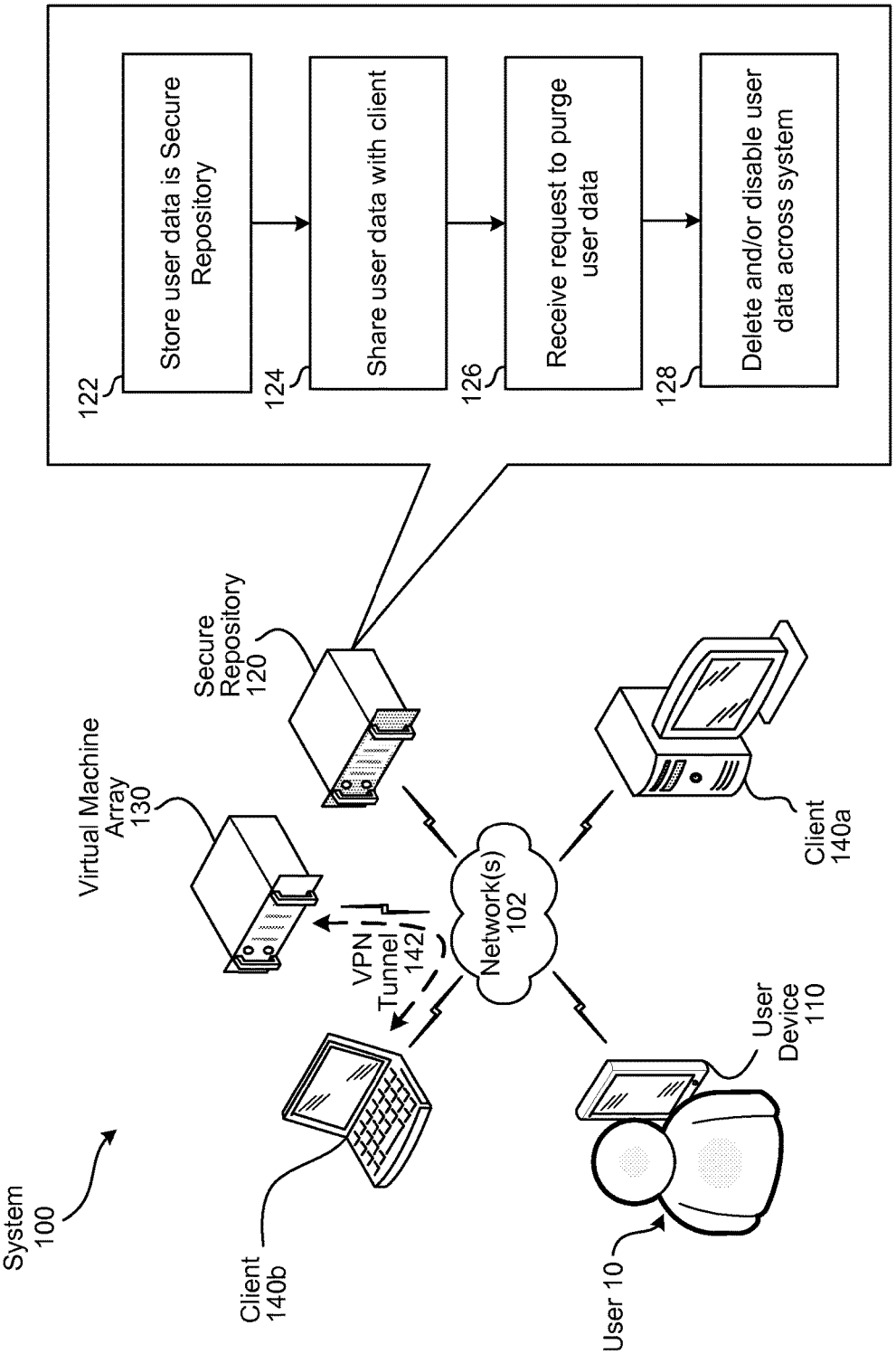
FIG. 1 illustrates a system for managing the access of client computers to user data.

FIG. 1 illustrates a system 100 that includes a secure repository 120 that allows researchers to copy and process user data on client computer systems 140a, 140b, while at the same time providing the user 10 the ability to have their data removed from the system 100. Processing may also be performed on a "computational grid" 130, which may be an array of virtual machines that may be connected to a client computer (e.g., 140b) via a secure virtual private network tunnel 142, providing researchers additional computational resources by processing the user data on a secure remote system. The virtual machine array 130 may be, for example, the system(s) associated with network-based "cloud" computing resources. A virtual machine of the computational grid 130 may be viewed as a processor linked to the client computer, and as such, actions attributed below to a client computer 140 include actions of a virtual machine on the computational grid 130 that is tasked to a client computer.

The secure repository 120 receives (122) user data from a user device 110 via a network 102. At least some of the user data is confidential. "Confidential" data is data where a user has an expectation of privacy and/or the recipient has a duty to protect the data, such as data that identifies the user and/or contains personal or financial information, data that contains the user's voice or image, data that is defined as confidential by a privacy policy, terms-of-service and/or operation of law, etc. Although secret data is confidential, not all confidential data is necessarily secret (e.g., a recording of the user's voice or image may be confidential, but ordinarily would not be regarded as secret). Data may be designated as confidential by the user, by the software on the device transmitting the data, and/or by the receiving computer. If metadata tags are included with the user data that identifies the nature of the content, the receiving computer may apply rules to the metadata to determine whether content should be designated as confidential.

This data may arrive encrypted (e.g., encrypted by a software application on the user device 110), or be encrypted after it arrives at the secure repository 120. The secure repository shares (124) the encrypted user data over a network 102 with trusted software on one or more of the client devices 140a, 140b. The user data may be shared individually or as part of bundled data relating to multiple users, but in either case, the secure repository associates specific data with specific users, and this association continues to be maintained by the trusted software on the client devices, even after such data is altered by processing on the client device, until such time that the processed data is deemed "anonymized." The decision as to whether user data has become sufficiently anonymous and devoid of confidential data, so as to permit breaking the association with the individual user, may be based on the researcher having run particular, designated transformations or processes on the data, may be the result of a pattern recognition algorithm comparing the original and processed data and determining that the correlation is below a particular threshold, and/or may be based on action by the researcher to certify that the processed data is anonymized. The association of processed data with individual user may be maintained using metadata tags, index tables, or the like.

If the secure repository 120 receives (126) a request to purge user data, it may proceed to do so in accordance with rules that specify how and when the purge will proceed. These rules may be shared in advance with the user 10 at the time they opt-in to data sharing, based on a terms-of-service agreement, or in a similar manner. For instance, the rules may allow researchers a fixed number of days following a purge request to permit them an opportunity to advance their research to a good "stopping" point.

After receiving (126) the purge request from the user 10, the secure repository 120 deletes its copy of the user data, deletes encryption keys associated with the user data, and deletes and/or disables the user data across the system. The disabling of the data on the virtual machine/client device 140 may be accomplished, among other ways, by instructing the virtual machine/client devices 140 to delete the original and processed user data and/or to delete the key(s) used to decrypt access the user data.

The trusted software on the virtual machines/client devices 140 may periodically delete the key(s) used to decrypt the user data (original and processed), the key(s) may have a specified lifetime or end-date (at which time the virtual machine/client device 140 may automatically delete a respective key), and/or the client device's key may disabled by the secure repository 120 revoking a certificate linked to the key (the certificate being held by the secure repository 120 or another trusted authority separate from the virtual machines/client devices 140). If the software on the virtual machine/client device 140 must periodically renew its key(s) in order to access the original and processed user data, then the secure repository 120 may permanently disable the client device's access to the user data by declining the client's renewal after the user 10 asks for their data to be purged.

The network (of networks 102) by which the user 10 communicates with the secure repository 120 may be different than the network (of networks) used by the secure repository to communicate with the rest of the system 100. For example, the client computers 140 and virtual machine array 130 may be on a same local area network as the secure repository 120, whereas the user 10 may connect remotely over the Internet.

Figure 2:
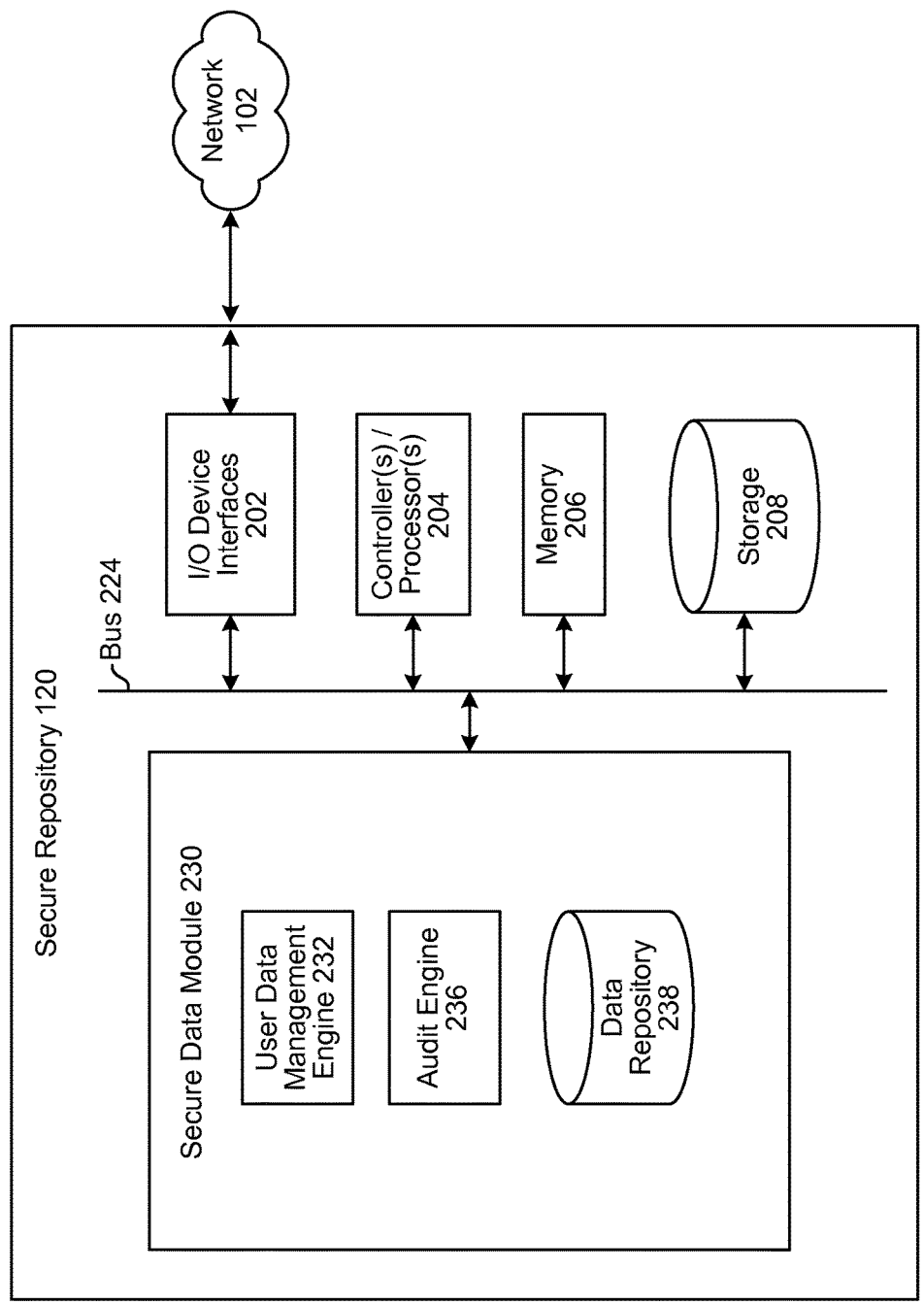
FIG. 2 is a block diagram conceptually illustrating example components of a secure repository which stores and manages access to user data.

FIG. 2 illustrates a block diagram conceptually illustrating example components of the secure repository 120. In operation, the components may include computer-readable and computer-executable instructions that reside in memory 206 and/or storage 208, as will be discussed further below.

The secure repository 120 includes input/output device interfaces 202. A variety of components may be connected through the input/output device interfaces 202, such as a directly connected administrative terminal (not shown). The input/output device interfaces 202 may also include an interface for an external peripheral device connection such as universal serial bus (USB), Thunderbolt, or other connection protocol. The input/output device interfaces 202 may also include a connection to one or more networks 102 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network(s) 102, components of secure repository 120 may be distributed across a networked environment.

The secure repository 120 may include an address/data bus 224 for conveying data among components of the secure repository 120. Each component within the secure repository 120 may also be directly connected to other components in addition to (or instead of) being connected to other components across the bus 224.

The secure repository 120 may include one or more controllers/processors 204, that may each include a central processing unit (CPU) for processing data and computer-readable instructions, and a memory 206 for storing data and instructions. The memory 206 may include volatile random access memory (RAM), non-volatile read only memory (ROM), non-volatile magnetoresistive (MRAM) and/or other types of memory. The secure repository 120 may also include a data storage component 208, for storing data and controller/processor-executable instructions (e.g., instructions to perform the processes performed by the secure repository 120 in FIGS. 5 and 6). The data storage component 208 may include one or more non-volatile storage types such as magnetic storage, optical storage, solid-state storage, etc. The secure repository 120 may also be connected to removable or external non-volatile memory and/or storage (such as a removable memory card, memory key drive, networked storage, etc.) through the input/output device interfaces 202.

Computer instructions for operating the secure repository 120 and its various components may be executed by the controller(s)/processor(s) 204, using the memory 206 as temporary "working" storage at runtime. The computer instructions may be stored in a non-transitory manner in non-volatile portions of memory 206, storage 208, or an external device. Alternatively, some or all of the executable instructions may be embedded in hardware or firmware in addition to or instead of software.

The secure repository 120 further includes a secure data module 230 that manages confidential user data. The secure data module 230 works in conjunction with secure data module 330 and/or trusted software a applications on the client devices 140*a*, 140*b* to maintain the integrity of the user data.

The secure data module 230 includes a user data management engine 232 which manages encryption, associating user data with the user 10, issuance and revocation of keys, and deletion of user data from the system 100 after receiving a purge request from a user 10. The user data management engine 232 operates in coordination with audit engine 236 that tracks when user data is accessed (and by whom), which client devices 140 have obtained copies of the user data, which client devices 140 have been issued keys to access the user data, when the key(s) expired or are set to expire, when user data was deleted by the secure repository 120, and whether and when the original user data, processed user data, and/or key(s) were confirmed as deleted by the trusted software and/or secure data module 330 on the client devices 140.

The data repository 238 of the secure data module 230 holds encrypted user data, stores the association of the user data with the user 10, and stores the key or keys used to encrypt and/or decrypt the user data. If certificates are linked to keys, the data repository 238 may also store the certificates (with the user data management engine 232 or some other component fulfilling the role of certificate authority). The data repository 238 may be part of storage 208, or may be one or more separate non-volatile storage systems. For example, different data held by the data repository may be divided across multiple storage components, including storage 208.

Figure 3:
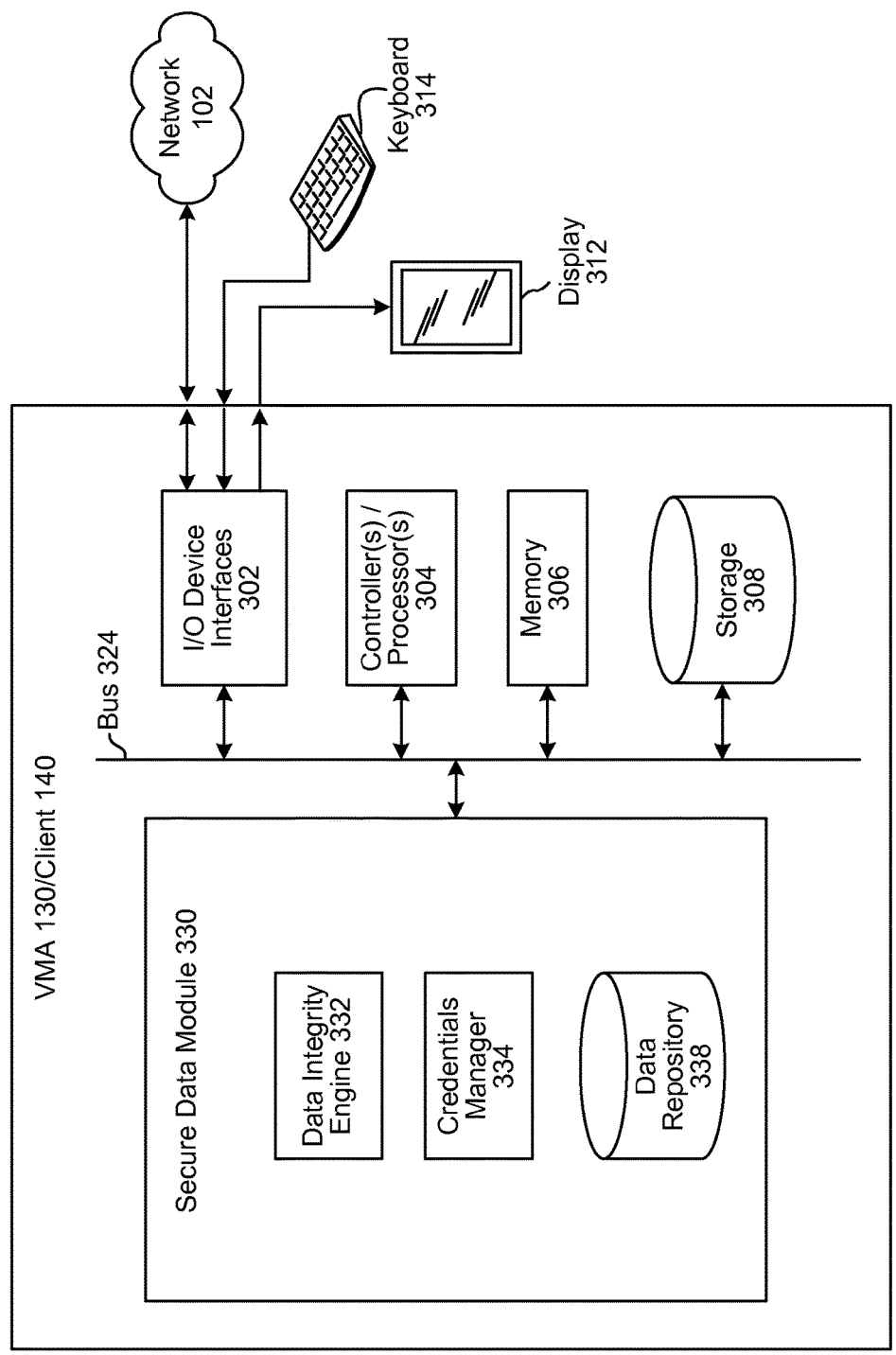
FIG. 3 is a block diagram conceptually illustrating example components of a client computer and/or virtual machine array which may store a copy of the user data and process the user data.

FIG. 3 illustrates a block diagram conceptually illustrating example components of the client device 140 (likewise applying to the virtual machine array 130 in a distributed computing environment). In operation, the components may include computer-readable and computer-executable instructions that reside in memory 306 and/or storage 308, as will be discussed further below.

The client device 140 includes input/output device interfaces 302. A variety of components may be connected through the input/output device interfaces 302, such as a display 312 and a keyboard 314. The input/output device interfaces 302 may also include an interface for an external peripheral device connection such as universal serial bus (USB), Thunderbolt, or other connection protocol. The input/output device interfaces 302 may also include a connection to one or more networks 102 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network(s)

102, components of client device 140 may be distributed across a networked environment.

The client device 140 may include an address/data bus 324 for conveying data among components of the client device 140. Each component within the client device 140 may also be directly connected to other components in addition to (or instead of) being connected to other components across the bus 324.

The client device 140 may include one or more controllers/processors 304, that may each include a central processing unit (CPU) for processing data and computer-readable instructions, and a memory 306 for storing data and instructions. The memory 306 may include volatile random access memory (RAM), non-volatile read only memory (ROM), non-volatile magnetoresistive (MRAM) and/or other types of memory. The client device 140 may also include a data storage component 308, for storing data and controller/processor-executable instructions (e.g., instructions to perform the processes performed by the client device 140 in FIGS. 5 and 6). The data storage component 308 may include one or more non-volatile storage types such as magnetic storage, optical storage, solid-state storage, etc. The client device 140 may also be connected to removable or external non-volatile memory and/or storage (such as a removable memory card, memory key drive, networked storage, etc.) through the input/output device interfaces 302.

Computer instructions for operating the client device 140 and its various components may be executed by the controller(s)/processor(s) 304, using the memory 306 as temporary "working" storage at runtime. The computer instructions may be stored in a non-transitory manner in non-volatile portions of memory 306, storage 308, or an external device. Alternatively, some or all of the executable instructions may be embedded in hardware or firmware in addition to or instead of software.

The client device 140 further includes a secure data module 330 that manages confidential user data. The secure data module 330 works in conjunction with trusted software applications on the client devices 140a, 140b and the secure data module 230 of the secure repository 120 to maintain the integrity of the user data.

The secure data module 230 includes a data integrity engine 332 which manages all interactions with the user data, including decryption and encryption of user data (original and processed), associating processed user data with the user 10, maintaining the association of user data with the user 10, deleting user data (original and processed), and reporting purge compliance to the secure repository 120. The data integrity engine 332 may also perform pattern recognition to determine whether a comparison of original and processed user data is above or below a threshold, so as to determine whether processed data must be deleted in response to a user purge instruction from the secure repository 120. The data integrity engine 332 may be, among other things, part of the operating system kernel on the virtual machine/client device 140, and/or a software component of a "trusted" program or application.

The data integrity engine 332 works in coordination with a credentials manager 334, which maintains and deletes keys, and requests renewed keys when a key has expired or been deleted. If keys are linked to certificates, the credentials manager 334 may query a certificate authority (which may be an aspect of the secure repository 140) to determine if the key is still valid prior to use.

A data repository 338 of the secure data module 330 holds encrypted user data, stores the association of the user data with the user 10, and stores the key or keys used to encrypt and/or decrypt the user data. The data repository 338 may be part of storage 308, or may be one or more separate non-volatile storage systems. For example, different data held by the data repository may be divided across multiple storage components, including storage 308. Unencrypted copies of the original user data and the processed user data may be restricted to volatile portions of memory 206, or if stored in a nonvolatile portion of memory 206, storage 208, or data repository 238, may be periodically deleted by the data integrity engine 332 (e.g., deleted after an encrypted version of the processed user data is stored.

Figure 4:
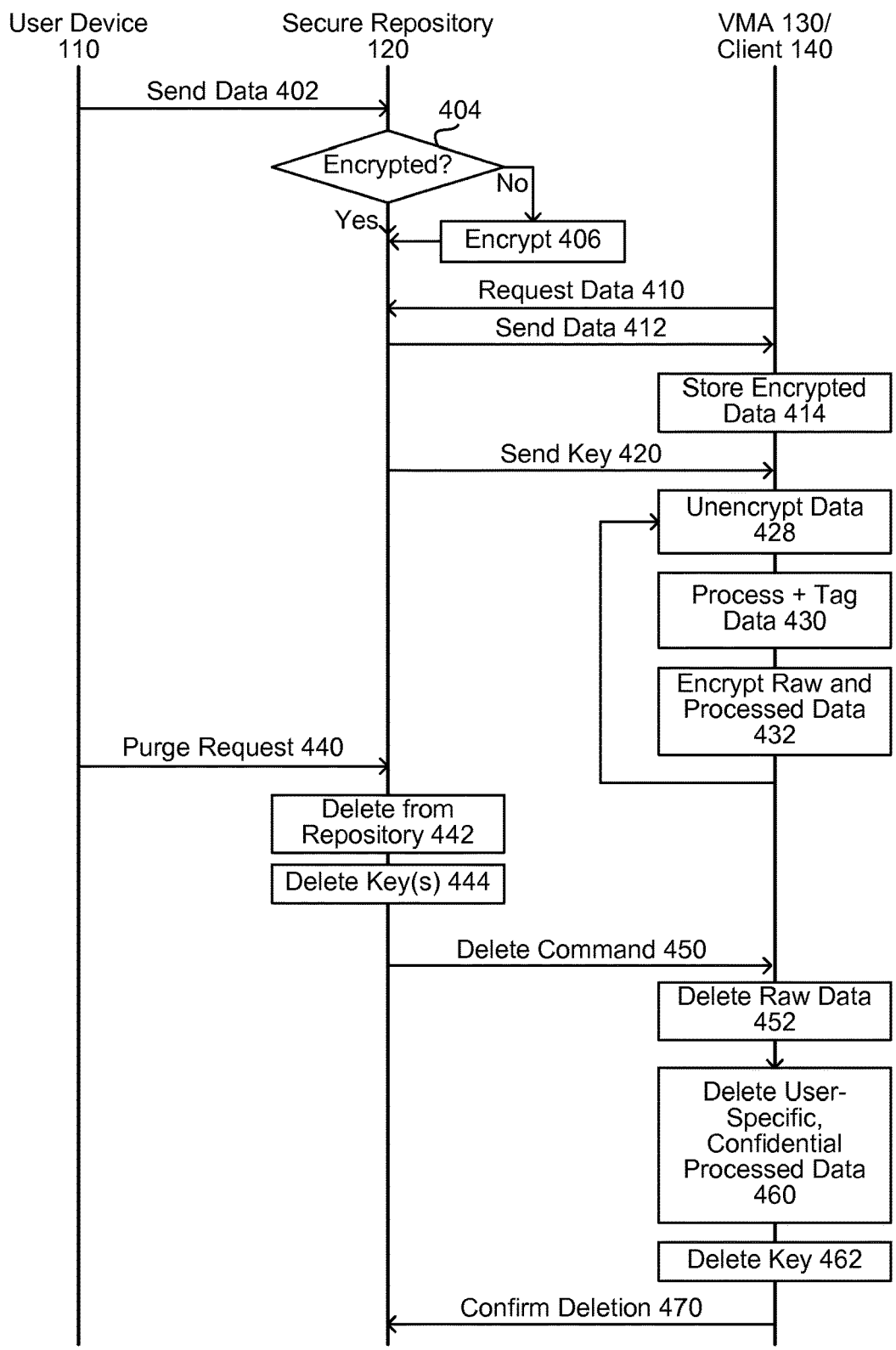
FIG. 4 is a hybrid diagram illustrating examples of communication transactions and activities in a system where the client computer retains access to the user data.

FIG. 4 illustrates an example of operation of the system 100 for managing user data. The user device 110 may send (402) user data to the secure repository 120, or the secure repository 120 may receive the data from another source together with an association of the data with the user 10. The secure repository 120 may check (404) to see if the user data is already encrypted, and if not, encrypts (406) the data prior to storage in the data repository 238.

Thereafter, a client 140 requests (410) user data. This request may be, among other things, a batch request for data from multiple users, or a request for data from users meeting a specified criteria. The secure repository 120 then sends (412) a copy of the encrypted user data to the client 140, after which the client 140 stores (414) the encrypted data.

Either together with the user data or as a separate transaction, the secure repository 120 may also provide the client 140 with a key or keys to decrypt and/or encrypt the user data.

When a researcher on the client device 140 goes to process the user data, the data integrity engine 332 unencrypts (428) the user data using a key provided by the credentials manager 334. A software application executed by the controller(s)/processor(s) 304 and linked to the secure data module 330 then processes the unencrypted user data. The processing may include processing for research purposes or other processing as determined by the client. The data integrity engine 332 may tag (430) or otherwise track that the processed data includes user data so that there is a record of what processed data is associated with the proper users. After processing, the data integrity engine 332 re-encrypts (432) or deletes the unencrypted user data, and encrypts and stores the processed data along with the tags (or other data indicating the processed data includes user data).

After the secure repository 120 receives a purge request (440) from a user device 110, the user management engine 232 deletes (442) the copy of the user data held by the data repository and one or more encryption keys (444), such as the encryption key associated with the user, an encryption key associated with a group of user including the user, or an encryption key for a batch of data for a plurality of users including the user. Groups may be defined by any criteria (e.g., first character of family name), whereas a "batch" of data may be aggregated without criteria (e.g., an entirety of the data sent in transaction 412). The user data management engine 232 may also issue delete commands (450) to clients 140, if the audit engine 236 indicates that the client 140 may have copies of the user's data.

Thereafter, the data integrity engine 332 deletes (452) the original user data from the data repository 338, and determines whether processed user data has been anonymized, eliminating the confidential aspects of the user data. This determination may be made by comparing processed data to user data (using techniques such as pattern recognition), or may be based on flag and tags generated by the processing application or researcher. If the processed data has not been anonymized, the data integrity engine 332 extracts and deletes (460) user-specific confidential data from the processed data. If the processed data is also based on user data from other users, data that is not based on the user 10 issuing the purge request (440) may be left intact. The credentials manager 334 may then delete (462) the key used to decrypt the user data. The credentials manager 334 will also delete (462) the key if the data is fully anonymized for user 10, containing no confidential data.

If the user 10 requesting the data purge shares a key with a group or batch of users, deleting the raw data (452) and processed data (460) may include deleting data associated with other users associated with the same key, since once the key is deleted (462), their data will become inaccessible.

Figure 5:
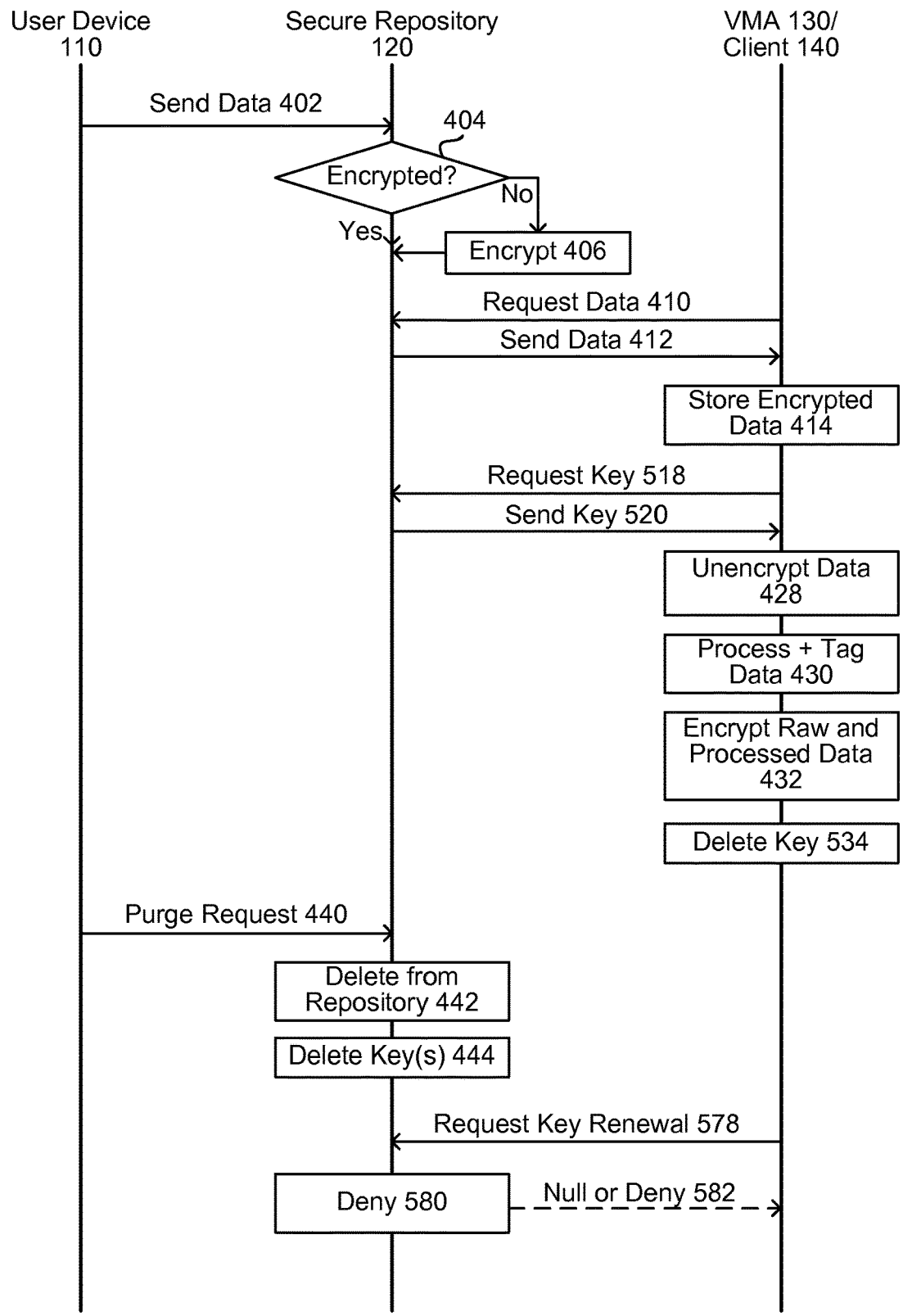
FIG. 5 is a hybrid diagram illustrating examples of communication transactions and activities in a system where the client computer periodically renews access to the user data.

FIG. 5 illustrates another example of the system 100 managing user data. In this example, the credentials manager 334 of the client 140 periodically deletes the key or keys used to access user data. As referred to in the discussion of FIG. 4, a user may be associated with a unique key, may be associated with a group of users that is associated with a key, or may be part of a batch of user data that uses a single key for the entire batch. The client device 140 must periodically renew its key(s) in order to access the original and processed user data.

If prior to receiving a purge request 440 from the user device 110, the secure repository 120 receives a request for a key (518) from the client 140, the user data management engine 232 issues (520) a key. As noted above, this key may be time limited, such as sending the key with instructions to the credentials manager 334 to delete the key at a specified time. Keys may also be periodically replaced by the secure repository 120, in which case the virtual machine/client device 140 decrypts data with the old key and re-encrypts it with the new key.

Having obtained a key, the client device 140 may then unencrypt (428), process and tag (430), and encrypt (432) and/or delete unencrypted the user data as described with FIG. 4. Thereafter, the credentials manager 334 deletes the client's key.

As in FIG. 4, the secure repository 120 receives a purge request 440 from the user and deletes the user's data from the data repository 228. In this example, however, no delete command may be issued if the audit engine 236 indicates that the client's key is already deleted and/or expired. However, if the client device 140 thereafter requests a key renewal (578), the user data management engine 232 denies (580) the request, either ignoring it or sending (582) the client 140 an affirmative denial. Since the client 140 no longer has access to the user data, it is effectively purged.

The examples illustrated in FIGS. 4 and 5 may be used together in a same system, with different clients adhering to different key maintenance policies. Moreover, if client 140 deletes a key but does not report the deletion to the audit engine 236, the secure repository may issue a delete command 450 to the client 140. Since the client 140 may be unable to extract user-specific processed data without a key, the result may be the data integrity engine either doing nothing (since access is disable, the data is effectively purged), or deleting all of the processed data associated with the user 10 (which if mixed with other users' data may delete results based on the other users' data as well).

The concepts disclosed herein may be applied within a number of different devices and computer systems, including, for example, general-purpose computing systems, server-client computing systems, mainframe computing systems, mobile computers, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, data repository management, and data mining, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the critical data module 230 and the secure data module 330 may be implemented as firmware or as a state machine in hardware. For example, at least the audit engine 236 of the critical data module 230 and the credentials manager 334 of the secure data module 330 may be may be implemented as an application specific integrated circuit (ASIC), as a field programmable gate array (FPGA), or some combination thereof. In addition, the aspects of the critical data management engines 232 may be integrated into drive controllers used with data repositories 238 and 338.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving, from a first device associated with user profile data, first user data associated with a first user;
   storing encrypted first user data in a data store, wherein the encrypted first user data corresponds to the first user data;
   receiving, from a second device unassociated with the user profile data, a first request for data associated with a plurality of users;
   sending, to the second device and after receiving the first request, the encrypted first user data;
   sending, to the second device and after receiving the first request, a key used to decrypt the encrypted first user data;
   receiving, from the first device, a second request to delete data associated with the user profile data;
   deleting, after receiving the second request, the encrypted first user data from the data store;
   determining first data generated from the encrypted first user data, the first data being generated by the second device;
   determining a correlation between the first data and the encrypted first user data;
   determining the correlation fails to satisfy a condition representing a lack of correlation; and
   based at least in part on determining the correlation fails to satisfy the condition, sending, to the second device, a signal indicating the first data is to be deleted.

2. The computer-implemented method of claim 1, further comprising:
receiving second user data associated with second user profile data;
storing encrypted second user data in the data store, the encrypted second user data corresponding to the second user data;
receiving, from the second device, a third request for data associated with at least one user; and
sending, to the second device and after receiving the third request, the encrypted second user data.

3. A computing system, comprising:
at least one processor; and
at least one memory including instructions that, when executed by the at least one processor, cause the computing system to:
store encrypted first user data in a data store, the encrypted first user data being associated with user profile data;
receive, from a first device unassociated with the user profile data, a first request for data associated with a plurality of users;
send, to the first device, the encrypted first user data;
receive, from a second device associated with the user profile data, a second request to delete data associated with the user profile data;
delete, after receiving the second request, the encrypted first user data from the data store;
determine first data generated from the encrypted first user data, the first data being generated by the first device;
determine a correlation between the first data and the encrypted first user data;
determine the correlation fails to satisfy a condition representing a lack of correlation; and
based at least in part on determining the correlation fails to satisfy the condition, send, to the first device, a signal indicating the first data is to be deleted.

4. The computing system of claim 3, wherein the at least one memory further includes instructions that, when executed by the at least one processor, further cause the computing system to:
determine an expiration time for the first device to have access to the encrypted first user data; and
send, to the first device, second data representing the expiration time.

5. The computing system of claim 3, wherein the at least one memory further includes instructions that, when executed by the at least one processor, further cause the computing system to:
receive first user data;
determine at least a portion of the first user data is unencrypted; and
encrypt the at least a portion to generate the encrypted first user data.

6. The computing system of claim 3, wherein the at least one memory further includes instructions that, when executed by the at least one processor, further cause the computing system to:
send, to the first device, a first key to decrypt the encrypted first user data;
store encrypted second user data in the data store, the encrypted second user data being associated with second user profile data;
send, to the first device, the encrypted second user data; and
send, to the first device, a second key to decrypt the encrypted second user data, the first key and the second key being different.

7. The computing system of claim 6, wherein the signal further indicates the first key is to be deleted.

8. The computing system of claim 3, wherein the at least one memory further includes instructions that, when executed by the at least one processor, further cause the computing system to:
store encrypted second user data in the data store, the encrypted second user data being associated with second user profile data;
send, to the first device, the encrypted second user data; and
send, to the first device, a key configured to decrypt both the encrypted first user data and the encrypted second user data.

9. The computing system of claim 8, wherein the signal further indicates the key is to be deleted.

10. The computing system of claim 3, wherein the at least one memory further includes instructions that, when executed by the at least one processor, further cause the computing system to:
after receiving the second request, receive, from the first device, a third request to renew a key used to decrypt the encrypted first user data; and
based at least in part on receiving the second request, prevent the key from being renewed.

11. The computing system of claim 3, wherein:
the signal indicates a period of time; and
the signal indicates the data associated with the user profile data is to be deleted when the period of time has transpired.

12. The computing system of claim 3, wherein the at least one memory further includes instructions that, when executed by the at least one processor, further cause the computing system to:
delete, after receiving the second request, an encryption key used to generate the encrypted first user data and encrypted second user data associated with second user profile data.

13. The computing system of claim 3, wherein the at least one memory further includes instructions that, when executed by the at least one processor, further cause the computing system to:
receive the first request via a first network; and
receive the second request via a second network.

14. A computer-implemented method, comprising
storing encrypted first user data in a data store, the encrypted first user data being associated with user profile data;
receiving, from a first device unassociated with the user profile data, a first request for data associated with a plurality of users;
sending, to the first device, the encrypted first user data;
receiving, from a second device associated with the user profile data, a second request to delete data associated with the user profile data;
deleting, after receiving the second request, the encrypted first user data from the data store;
determining first data generated from the encrypted first user data, the first data being generated by the first device;
determining a correlation between the first data and the encrypted first user data;
determining the correlation fails to satisfy a condition representing a lack of correlation; and based at least in part on determining the correlation fails to satisfy the condition, sending, to the first device, a signal indicating the first data is to be deleted.

15. The computer-implemented method of claim 14, further comprising:
   determining an expiration time for the first device to have access to the encrypted first user data; and
   sending, to the first device, second data representing the expiration time.

16. The computer-implemented method of claim 14, further comprising:
   receiving first user data;
   determining at least a portion of the first user data is unencrypted; and
   encrypting the at least a portion to generate the encrypted first user data.

17. The computer-implemented method of claim 14, further comprising:
   sending, to the first device, a first key to decrypt the encrypted first user data;
   storing encrypted second user data in the data store, the encrypted second user data being associated with second user profile data;
   sending, to the first device, the encrypted second user data; and
   sending, to the first device, a second key to decrypt the encrypted second user data, the first key and the second key being different.

18. The computer-implemented method of claim 17, wherein the signal further indicates the first key is to be deleted.

19. The computer-implemented method of claim 14, further comprising:
   storing encrypted second user data in the data store, the encrypted second user data being associated with second user profile data;
   sending, to the first device, the encrypted second user data; and
   sending, to the first device, a key configured to decrypt both the encrypted first user data and the encrypted second user data.

20. The computer-implemented method of claim 19, wherein the signal further indicates the key is to be deleted.

21. The computer-implemented method of claim 14, further comprising:
   storing encrypted second user data in a data store, the encrypted second user data being associated with second user profile data;
   receiving, from the first device, a third request for data associated with a second plurality of users;
   sending, to the first device, the encrypted second user data;
   receiving, from a third device associated with the second user profile data, a fourth request to delete data associated with the second user profile data;
   deleting, after receiving the fourth request, the encrypted second user data from the data store;
   determining second data generated from the encrypted second user data, the second data being generated by the first device;
   determining a second correlation between the second data and the encrypted second user data;
   determining the second correlation satisfies the condition; and
   based at least in part on determining the second correlation fails to satisfy the condition, permitting the second data to persist.

22. The computer-implemented method of claim 14, further comprising:
   determining the first data was further generated from encrypted second user data, the encrypted second user data being associated with second user profile data,
   wherein the signal further indicates a portion of the first data, corresponding to the encrypted second user data, is not to be deleted.

* * * * *